Aug. 9, 1927.
W. C. NIEBUHR
1,638,209
SEPARABLE RING
Filed Oct. 1, 1925
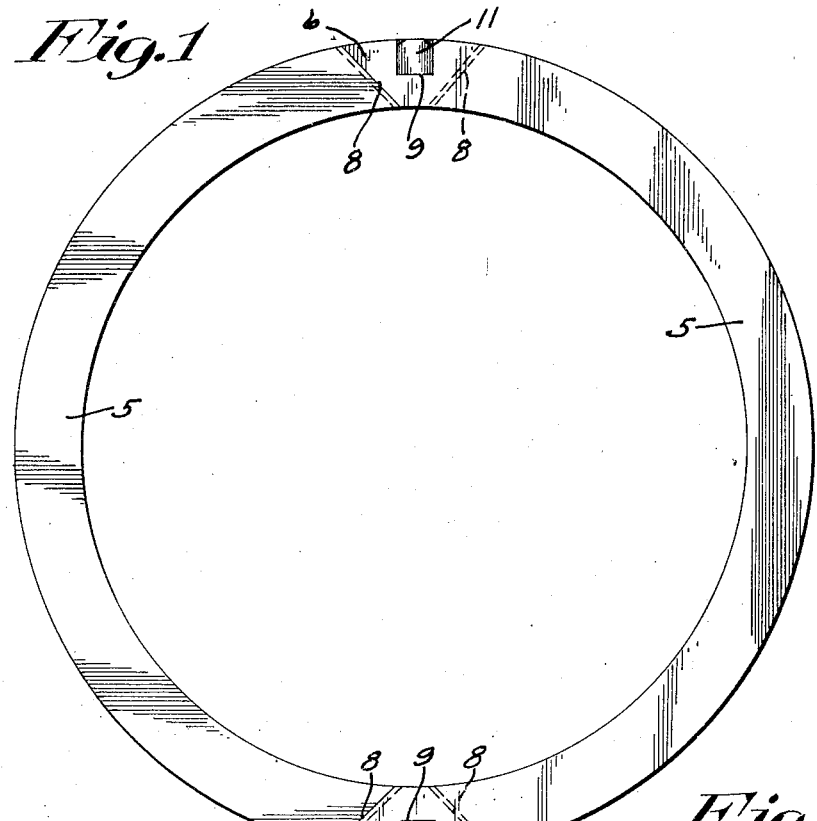
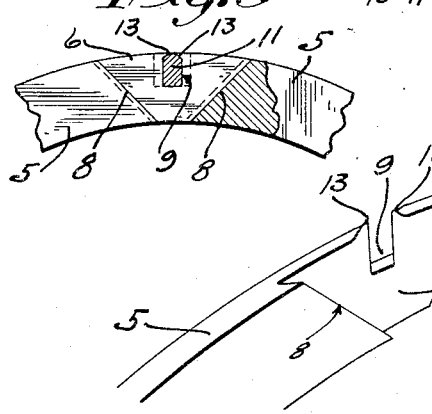
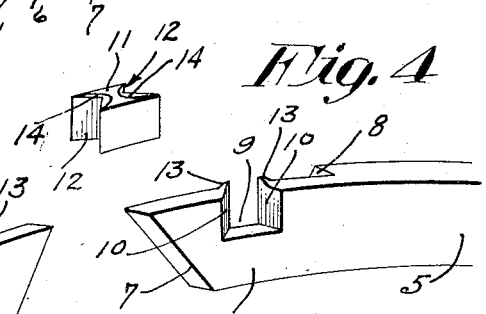
Inventor
William Charles Niebuhr
By his Attorneys
Merchant and Kilgore Patented Aug. 9, 1927.

1,638,209

UNITED STATES PATENT OFFICE.

WILLIAM CHARLES NIEBUHR, OF ST. JAMES, MINNESOTA.

SEPARABLE RING.

Application filed October 1, 1925. Serial No. 59,852.

My present invention has for its object to provide an extremely simple and highly efficient separable ring especially adapted as a machine element that is applicable circumferentially around a shaft as a collar, washer, spacer or the like.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a side elevation of the improved separable ring;

Fig. 2 is an edge elevation of the same;

Fig. 3 is a fragmentary detail view partly in side elevation and partly in circumferential section taken on the line 3—3 of Fig. 2; and Fig. 4 is a fragmentary perspective view of the members of the ring and one of the keys, separated.

The improved ring comprises two duplicate members 5 having spliced end portions 6, the extreme outer ends of which are on lines that are oblique to radial lines and transversely beveled at 7. The ends of the ring members 5, at the inner ends of their spliced end portions 6, afford stop shoulders 8 that are also on lines that are oblique to radial lines but reversely inclined in respect to the respective ends 7. These stop shoulders 8 are undercut on the same bevel as the ends 7 and with which said ends abut with dove-tail interlocking engagement and securely hold the members of the ring against separation except in the plane of the ring.

Obviously, the spliced end portions 6 and their dove-tail interlocking engagement securely hold the members 5 of the ring against lateral separation, in true alignment in the plane of the ring, and in true spherical relation with freedom for sparation only in the plane of the ring, and on a line perpendicular to the diameter of the ring intersecting its spliced end portions 6. Notch-like transversely aligned half seats 9 are formed in the spliced end portions 6 at their peripheries and the sides of said seats are reversely beveled at 10. Duplicate block-like keys 11 are mounted in the notch-like half seats 9 by radial movement and have in their radial edges V-shaped grooves 12 into which the reversely beveled sides 10 of the seats 9 extend and which keys securely hold the members 5 against lateral separation, and they also securely hold said members against separation in the plane of the ring or against an inward movement in said plane.

To lock the keys 11 in the half seats 9, small outstanding lugs 13 are formed on the peripheries of the spliced end portions 6 on each side of said half seats, as shown in Fig. 4, and which lugs are adapted to be bent into recesses 14 formed in the tops of the keys 11, as best shown in Fig. 3.

From the above description it is evident that the members 5 of the separable ring may be easily and quickly circumferentially applied around a shaft between two members thereon and then assembled and connected by the keys 11.

The improved ring may be used in various different places where it would be very difficult or impossible to apply a solid ring axially around a shaft. Said improved separable ring may be used to take up end play, compensate for wear in connection with gearing, clutches and the like, and in actual usage has proven highly efficient for the purpose had in view.

What I claim is:

1. A ring comprising two separable members having spliced end portions in the peripheries of which are notch-like seats with reversely beveled sides, and block-like keys mounted in said seats by radial movement and having in their radial edges V-shaped grooves into which the reversely beveled sides of said seats extend.

2. The structure defined in claim 1 in which said keys have recesses in their tops, said spliced end portions having lugs adapted to be upset into said recesses.

3. A ring comprising two separable members having spliced end portions and stop shoulders with which the ends of said end portions abut and have dove-tail interlocking engagement, said members being free for separation in the plane of the ring, the ends of said end portions and the stop shoulders being on lines that are oblique to radial lines, said members having in their spliced end portions cooperating notch-like seats with reversely beveled sides, and block-like keys mounted in said seats and having in their radial edges V-shaped grooves in which the reversely beveled sides of said seats extend for holding said members against separation either laterally or in the plane of the ring.

4. A ring comprising two separable members having spliced end portions and stop shoulders with which the ends of said end portions abut and have dove-tail interlocking engagement, said members being free for separation in the plane of the ring, the ends of said end portions and the stop shoulders being on lines that are oblique to radial lines, said members having in the peripheries of their spliced end portions cooperating notch-like seats with reversely beveled sides, and block-like keys mounted in the said seats and having in their radial edges V-shaped grooves in which the reversely beveled sides of said seats extend for holding said members against separation, either laterally or in the plane of the ring, said keys having in their top recesses, said spliced end portions having lugs adapted to be upset in said recesses to hold the keys in their seats.

In testimony whereof I affix my signature.

WILLIAM CHARLES NIEBUHR.